United States Patent
Yoshioka et al.

(10) Patent No.: US 6,439,338 B2
(45) Date of Patent: Aug. 27, 2002

(54) BALL SCREW MECHANISM AND ELECTRICALLY POWERED STEERING DEVICE UTILIZING THE SAME

(75) Inventors: Morihisa Yoshioka; Koji Tateishi; Isamu Yoshida; Yoshinori Ikeda, all of Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/818,568

(22) Filed: Mar. 28, 2001

(30) Foreign Application Priority Data

Apr. 3, 2000 (JP) .......................... 2000-100356

(51) Int. Cl.⁷ .............................................. F16H 25/22
(52) U.S. Cl. ..................................... 180/444; 74/424.83
(58) Field of Search ........................ 74/424.82, 424.83, 74/424.86, 424.87; 180/443, 444

(56) References Cited

U.S. PATENT DOCUMENTS

| | | | |
|---|---|---|---|
| 2,851,897 A | * 9/1958 | Cochrane | |
| 3,156,133 A | * 11/1964 | Anthony | |
| 3,176,535 A | * 4/1965 | Rowland | |
| 4,272,476 A | * 6/1981 | Benton | 264/225 |
| 4,364,282 A | * 12/1982 | Nilsson | 74/424.8 A |
| 4,859,394 A | * 8/1989 | Benton | 264/225 |
| 4,924,722 A | * 5/1990 | Bacardit | 74/459 |
| 5,284,219 A | * 2/1994 | Shimizu et al. | 180/79.1 |
| 5,388,475 A | * 2/1995 | Shear, III et al. | 74/459 |
| 5,644,869 A | * 7/1997 | Buchanan, Jr. | 49/362 |
| 5,711,188 A | * 1/1998 | Miyaguchi et al. | 74/459 |
| 6,082,210 A | * 7/2000 | Ise | 74/459 |
| 6,112,610 A | * 9/2000 | Welling | 74/459 |
| 6,173,802 B1 | * 1/2001 | Kodaira et al. | 180/444 |
| 6,192,585 B1 | * 2/2001 | Buchanan, Jr. et al. | 29/898.06 |

FOREIGN PATENT DOCUMENTS

| | | | |
|---|---|---|---|
| DE | 4229583 | * | 3/1994 |
| EP | 0 957 294 A1 | | 11/1999 |
| FR | 2703122 | * | 9/1994 |
| GB | 2187259 | * | 9/1987 |

* cited by examiner

*Primary Examiner*—Avraham Lerner
(74) *Attorney, Agent, or Firm*—Sughrue Mion, PLLC (57) ABSTRACT

A ball screw mechanism (20) compact in size, employing a minimized number of component parts and having a high load capacity includes a rotary nut (22) having an internally threaded helical groove (26) and a mounting hole (30) both defined therein, and a simplified bridge member (24) mounted in the rotary nut (22). The bridge member (24) has a plurality of connecting grooves (28) defined on an inner surface thereof each operable to communicate neighboring convolutions of the internally threaded helical groove (26). The bridge member (24) has its opposite side edges formed with respective guide walls (36) protruding in a direction radially outwardly of the rotary nut (22) that are crimped to allow the bridge member (24) to be fixedly retained within the mounting hole (30).

23 Claims, 11 Drawing Sheets

BALL SCREW MECHANISM AND ELECTRICALLY POWERED STEERING DEVICE UTILIZING THE SAME

BACKGROUND OF THE INVENTION

1. Field of the Invention

The present invention relates to a ball screw mechanism and an electrically powered steering device utilizing such ball screw mechanism.

2. Description of the Prior Art

The electrically powered steering device for an automotive vehicle is a device for assisting a steering force of the steering wheel by means of an electric motor and is available in various types. One of them is a model designed not only to apply an axially shifting force to a retractable steering shaft drivingly coupled with a steering mechanism for wheels by translating a rotation of the steering wheel by means of a motion translating mechanism such as a rack-and-pinion mechanism but also to apply an output of an electric motor as an axially shifting force to the retractable steering shaft through a ball screw mechanism. In order to render the electrically powered steering device to be assembled compact in size and, hence, to the automotive vehicle to be lightweight in its entirety, the ball screw mechanism is desired to have a compact size and a high load capacity.

Figure 13A:
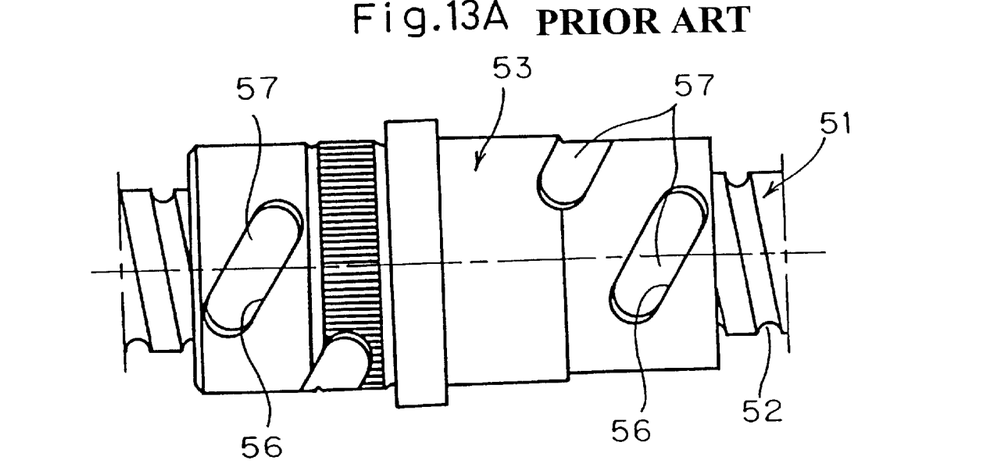
FIG. 13A is a longitudinal side view of the conventional ball screw mechanism.
Figure 13B:
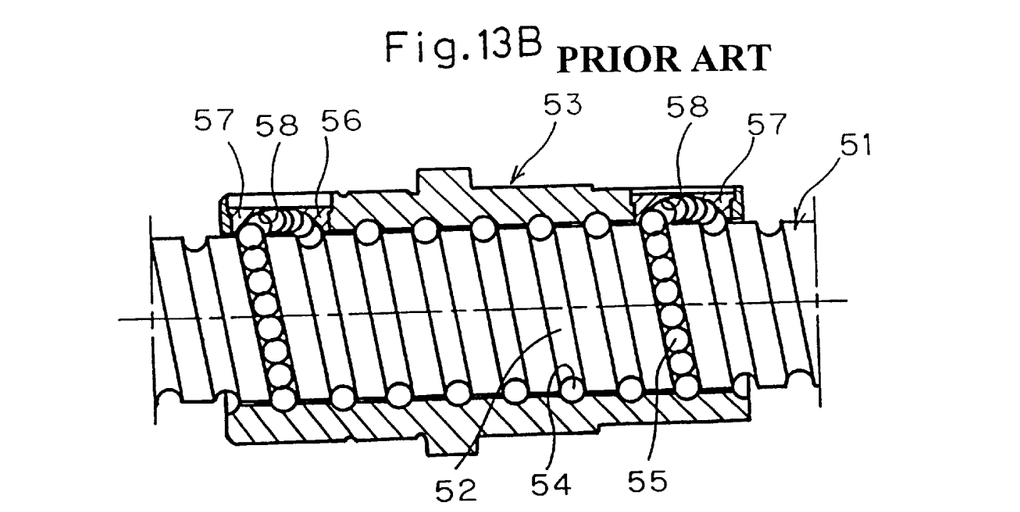
FIG. 13B is a longitudinal sectional view of the conventional ball screw mechanism shown in FIG. 13A.
Figure 13C:
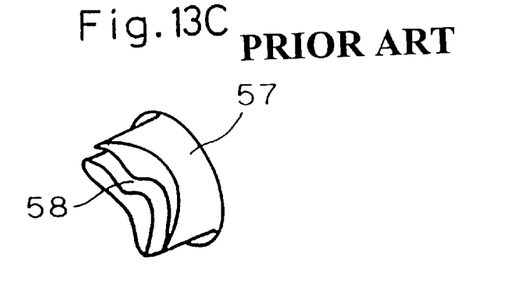
FIG. 13C is a perspective view of one of bridge members employed in the conventional ball screw mechanism shown in FIG. 13A.

The ball screw mechanism is also available in various types depending on the mode of circulation of a series of balls, including a bridge type ball screw design. The prior art bridge type ball screw mechanism is shown in FIGS. 13A to 13C, reference to which will now be made. A ball screw shaft 51 has its outer peripheral surface formed with an externally threaded helical groove 52 and has a rotary nut 53 mounted thereon. This rotary nut 53 has an inner peripheral surface with an internally threaded helical groove 54 cooperable with the externally threaded helical groove 52 and is threadingly engaged with the ball screw shaft 51 through a series of balls 55 that are received in part in the externally threaded helical groove 52 and in part in the internally threaded helical groove 54. A cylindrical wall defining the rotary nut 53 has a plurality of generally elliptical mounting holes 56 each extending completely across the thickness of the cylindrical wall of the rotary nut 53 having its opposite ends aligned respectively with the neighboring convolutions of the externally threaded helical groove 52. These elliptical mounting holes 56 are closed by a similarly elliptically shaped bridge member 57 that is fixedly plugged therein. The respective bridge member 57 has a concave surface where a connecting groove 58 is defined so that the neighboring convolutions of the internally threaded helical groove 54 are communicated with each other to thereby define a ball rolling passage along which the series of the balls 55 rollingly traverse from one of the convolutions of the internally threaded helical groove 54 to the next adjacent convolution of the same internally threaded helical groove 54. Thus, the series of the balls 55 movably interposed between the internally and externally threaded helical grooves 52 and 54 can rollingly move along and between the internally and externally threaded helical grooves 52 and 54 and are then guided along the connecting grooves 58 in the bridge members 57 so as to ride over corresponding threads of the ball screw shaft 51 from one convolution of the externally threaded helical groove 54 onto the next adjacent convolution of the externally threaded helical groove 54.

The bridge type ball screw mechanism has an advantage in that the rotary nut 53 can have a reduced outer diameter, but has a disadvantage in that because of the plural bridge members 57 necessitated the number of component parts forming the ball screw mechanism is large. Also, if an attempt is made to increase the load capacity, the bridge type ball screw mechanism tends to pose the following problems.

While one of the following means for increasing the load capacity is available in the ball screw mechanism, the bridge type ball screw mechanism cannot employ any of those means because of the reason described therein.

(1) To reduce the pitch to make it possible to increase the number of balls to be circulated. Where this means is employed, the use of the balls of a relatively small diameter results in decrease of the load capacity. Because of this, it is necessary to reduce the pitch without the ball diameter being altered. However, with the bridge type ball screw mechanism, it is not possible to reduce the pitch without the ball diameter being altered, because one bridge member 57 is necessitated for a single pitch (the span between the neighboring helical grooves).

(2) To form a groove between the successive leads to thereby form a multi-thread screws so that an effect similar to that afforded when the number of the balls to be circulated is increased. In the case of the multi-thread screw, the lead (the distance of movement per rotation) is limited and, therefore, the lead cannot be reduced. Also, although the multi-thread screw can be employed in an end-cap type ball screw mechanism, the bridge type ball screw mechanism cannot employ the multi-thread screw because as discussed in the previous paragraph one bridge member 57 is necessitated for a single pitch.

As discussed above, where the load capacity is desired to be increased in the bridge type ball screw mechanism, there is no way other than to employ the rotary nut having an increased length so that an increased number of the balls can be employed and, accordingly, while the bridge type ball screw mechanism is advantageous in that the rotary nut of a relatively small outer diameter can be employed, the use of the rotary nut of the increased length hampers compactization of the bridge type ball screw mechanism as a whole. Also, the use of the rotary nut of the increased length requires a corresponding increase of the number of the bridge members 57 used and, therefore, the number of machining processes and the number of component parts tend to increase, resulting in increase of costs required to manufacture the bridge type ball screw mechanism.

Figure 14:
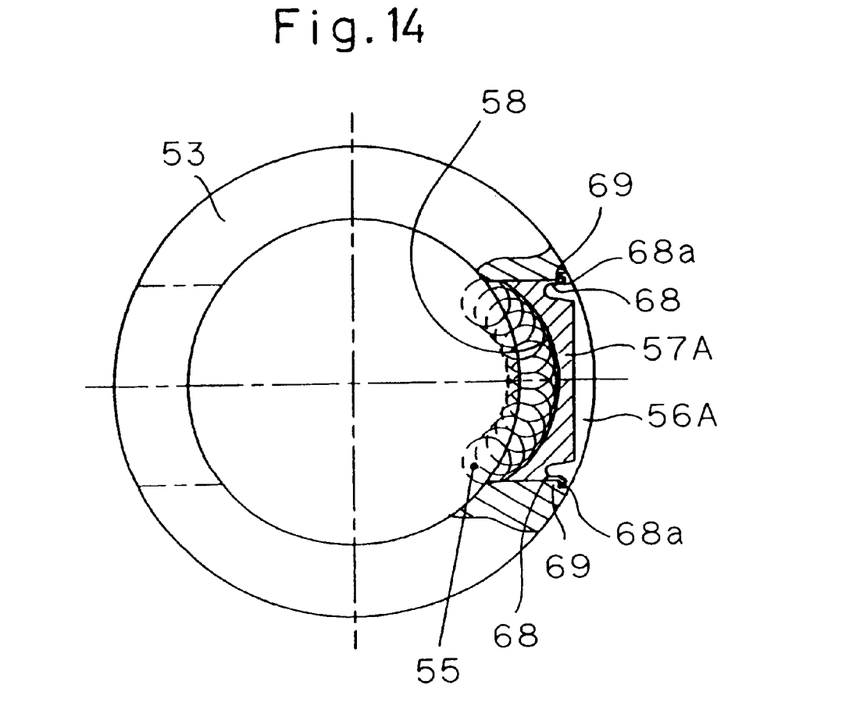
FIG. 14 is an end view, with a portion cut out, of the rotary nut employed in the ball screw mechanism proposed by the assignee of the present invention.
Figure 15:
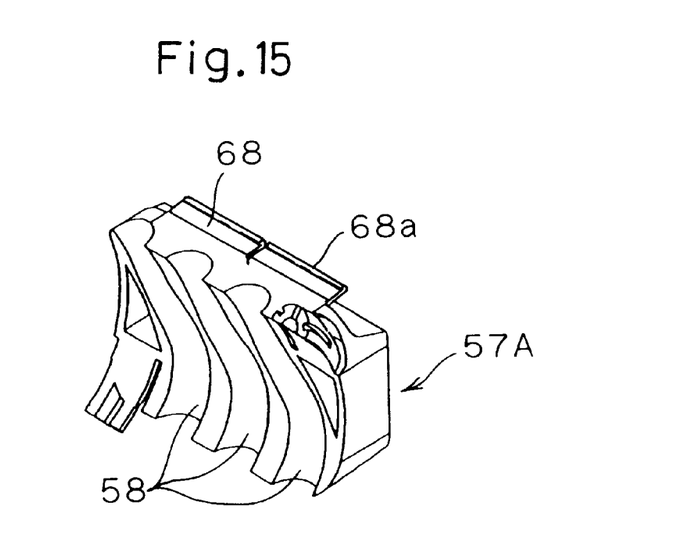
FIG. 15 is a perspective view of the bridge member employed in the rotary nut shown FIG. 14.

To alleviate the foregoing problems, the assignee of the present invention has filed the Japanese patent Application No. 11-313518 and the U.S. patent application Ser. No. 09/704,678, in which it is suggested a bridge member 57A having a plurality of connecting passages 58 defined therein as shown in FIGS. 14 and 15. The bridge member 57A disclosed therein has opposite side edges spaced in a direction circumferentially of the rotary nut 53, which edges are formed with respective guide walls 68 upstanding therefrom in a direction radially outwardly of the rotary nut 53. These guide walls 68 are each formed with a separation preventive projection 68a at a free edge thereof such that when the bridge member 57A is mounted in position within a mounting hole 56A defined in the rotary nut 53, the separation preventive projections 68a integral with the respective guide walls 68 are resiliently engaged against associated steps 69 formed on opposite side faces of the mounting hole 56A. By this engagement, the bridge member 57A is retained firmly within the mounting hole 56A in the rotary nut 53.

However, it has been found that where the guide walls 68 having the separation preventive projections 68a are integrally formed with the bridge member 57A, the guide walls 68 are prone to a considerable deformation and a difficulty in manufacture because each of the guide walls 68 is thin walled having a considerably small wall thickness.

SUMMARY OF THE INVENTION

Accordingly, the present invention is intended to provide a compact ball screw mechanism having a minimized number of component parts and also having a high load bearing capacity, wherein the bridge member of a simplified structure can easily, but firmly be fitted to the rotary nut.

The present invention has another object to facilitate formation by molding of the bridge member by simplifying the structure of the bridge member.

An additional object of the present invention is to provide an electrically powered steering device employing the ball screw mechanism of the type referred to above for transmitting an output of an electric motor, which mechanism is compact in size and easy to manufacture and having a high load capacity so that the device as a whole can be assembled compact in size.

In order to accomplish these objects of the present invention, in a first aspect of the present invention there is provided a ball screw mechanism which includes a ball screw shaft; a rotary nut having an internally threaded helical groove defined on an inner peripheral surface thereof in face-to-face relation with the ball screw mechanism; a plurality of balls rollingly accommodated in series within a ball rolling passage defined between the ball screw shaft and the internally threaded helical groove for transmitting a force from one of the rotary nut and the ball screw shaft to the other thereof, and at least one bridge member having at least one groove defined therein and mounted in the rotary nut with the groove communicating neighboring convolutions of the internally threaded helical groove. The bridge member is fixedly connected with the rotary nut by means of a plastic deformation.

According to this structure of the present invention, the bridge member is fixedly integrated with the rotary nut by the utilization of the plastic deformation. Accordingly, a simplified structure can be employed to integrate the bridge member with the rotary nut. Specifically, since the bridge member is allowed to undergo plastic deformation, the bridge member need not be provided with complicatedly shaped elements for engagement and can therefore be simplified in shape. For this reason, molding can easily be performed where the bridge member is to be formed of a sintered metal by the use of an injection molding technique.

Also, where the bridge member is formed with a plurality of connecting grooves, the pitch of the internally threaded helical groove can be reduced such that without the length of the rotary nut being increased, the number of the balls to be circulated can be increased to thereby increase the load bearing capacity. Because of this, together with the advantage of a reduced outer diameter of the rotary nut as is the case with that used in the conventional bridge type ball screw mechanism, it can have a compact size and an increased load capacity. Moreover, by forming the plural connecting grooves in one bridge member, the number of the bridge members to be employed can advantageously be reduced, resulting in a minimized number of component parts and ease to assembly and, accordingly the cost of manufacture can advantageously be reduced. In addition, the use of the plural connecting grooves in the single bridge member facilitates increase of the preciseness.

In the practice of the present invention, the bridge member may include an arm engageable with the internally threaded helical groove of the rotary nut for positioning the bridge member axially relative to the rotary nut.

By allowing the arm integral with the bridge member to engage in the internally threaded helical groove formed in the rotary nut as a ball rolling face, the bridge member can be highly accurately positioned relative to the rotary nut.

Also, in the practice of the present invention, the rotary nut may have at least one mounting hole defined therein for accommodating the bridge member and, on the other hand, side edges of the bridge member that are opposite to each other in a direction circumferentially of the rotary nut may be formed with respective guide walls upstanding therefrom in a direction radially of the rotary nut. In this structure, the guide walls are crimped to engage respective inner side faces of the mounting hole defined in the rotary nut to thereby allow the bridge member to be fixedly retained within the mounting hole.

The provision of the guide walls in the bridge member and the use of the crimping technique to crimp the guide walls to fix the bridge member relative to the rotary nut effectively facilitates fixture of the bridge member. In particular, the use of the crimping technique effectively eliminates the need to form the separation preventive projections at the free ends of the respective guide walls, resulting in simplification in shape of the bridge member. Because of this, where the bridge member is made of the sintered metal by the use of an injection molding technique, the molding can easily be accomplished.

In a second aspect of the present invention, there is provided a ball screw mechanism which is similar to that according to the first aspect of the present invention, but differs therefrom in that in place of the bridge member that is fixed to the rotary nut by the utilization of the plastic deformation, a separate fixing member is mounted on the bridge member. This separate fixing member includes guide walls upstanding therefrom in a direction radially of the rotary nut along opposite side edges of the rotary nut with respect to a circumferential direction thereof. These guide walls are resiliently engaged with opposite inner side faces of the mounting hole defined in the rotary nut.

According to this second aspect of the present invention, the guide walls of the separate fixing member mounted on the bridge member resiliently engage with the circumferentially spaced inner side faces of the mounting hole defined in the rotary nut to firmly secure the bridge member to the rotary nut. The use of the fixing member separate from, but mounted on the bridge member is effective to simplify the shape of the bridge member. Because of this, where the bridge member is made of a sintered metal by the use of an injection molding technique, the molding thereof can easily be accomplished.

Where the fixing member separate from the bridge member is employed, the separate fixing member may be prepared from a steel plate by means of a press work and is mounted on the bridge member by means of crimping the bridge member. Using the separate fixing member formed from a steel plate by the use of the press work makes it possible to mass-produce the fixing members at a low cost. Also, mounting of the fixing member on the bridge member by the use of a crimping technique facilitates integration of the fixing member with the bridge member.

Where the fixing member separate from the bridge member is employed, the fixing member may be prepared from a steel plate by means of a press work and is mounted on the bridge member by utilization of a resiliency of the fixing member.

Where the separate fixing member is formed from a steel plate by the use of the press work, it is possible to utilize the resiliency of the fixing member to mount the fixing member on the bridge member easily. Mounting of the fixing member by the utilization of its own resiliency can be accomplished if, for example, the fixing member is of a generally U-shaped configuration so that it can be fitted in a fashion sandwiching the bridge member.

According to a third aspect of the present invention, there is provided a ball screw mechanism which is similar to that according to the second aspect of the present invention, but differs therefrom in that in place of the separate fixing member employed in the second aspect, the mounting hole in the rotary nut has engagement steps defined in side faces of the mounting hole that are opposite to each other in a circumferential direction of the rotary nut and, on the other hand, the bridge member is formed with engagement grooves aligned and cooperable with the respective engagement steps, and a fixing member made up of a wire is utilized to engage in part with the engagement steps and in part within the engagement grooves to thereby allow the bridge member to be fixedly retained within the mounting hole.

According to this design, by allowing the fixing member in the form of a wire to be engaged in part within the engagement grooves in the bridge member and in part with the engagement steps in the rotary nut, the bridge member can be fixedly retained by the rotary nut. Even this design makes it possible to simplify the shape of the bridge member since the fixing member is separate from the bridge member. Because of this, where the bridge member is made of a sintered metal by the use of an injection molding technique, the molding can be easily accomplished.

In the structure according to any one of the first to third aspects of the present invention, the bridge member is preferably made of a sintered alloy. The use of the sintered alloy as material for the bridge member makes it possible for the bridge member to be manufactured by the use of injection molding and sintering techniques with no need to use any mechanical machining such as a grinding or a milling, resulting in a good mass-productivity. Accordingly, inexpensive manufacture is possible. Also, even in any one of the second and third aspects of the present invention, the plural connecting grooves may be formed in the single bridge member as is the case with that in the first mentioned aspect of the present invention.

The present invention also provides an electrically powered steering device which includes a housing; a steering shaft drivingly coupled with a steering mechanism for steering wheels; a motion translating mechanism for converting a rotational force of a steering wheel into a force required to displace the steering shaft in a direction axially thereof, a ball screw mechanism including a ball screw shaft defined by a portion of the steering shaft and a rotary nut operatively mounted on the ball screw shaft; and an electric motor for driving the rotary nut. The ball screw mechanism employed in this electrically powered steering device is of the structure described in connection with any one of the first to third aspects of the present invention.

In this electrically powered steering device, the ball screw mechanism employed therein for transmitting the output of the electric motor is compact in structure and has a high load capacity and, therefore, the electrically powered steering device itself can be assembled compact in size.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1A:
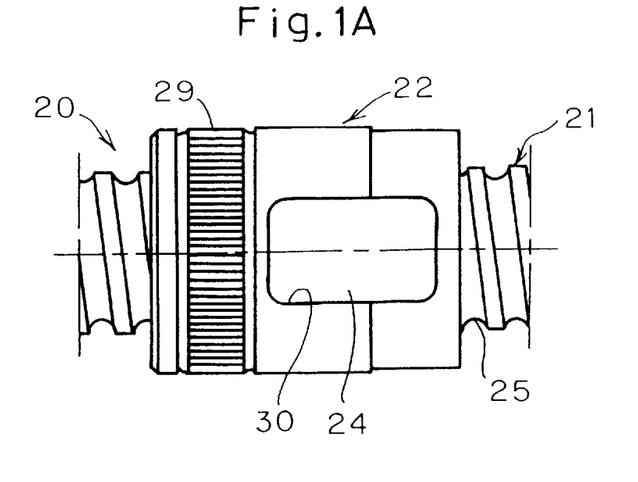
FIG. 1A is a side view of a ball screw mechanism according to a first preferred embodiment of the present invention.
Figure 1B:
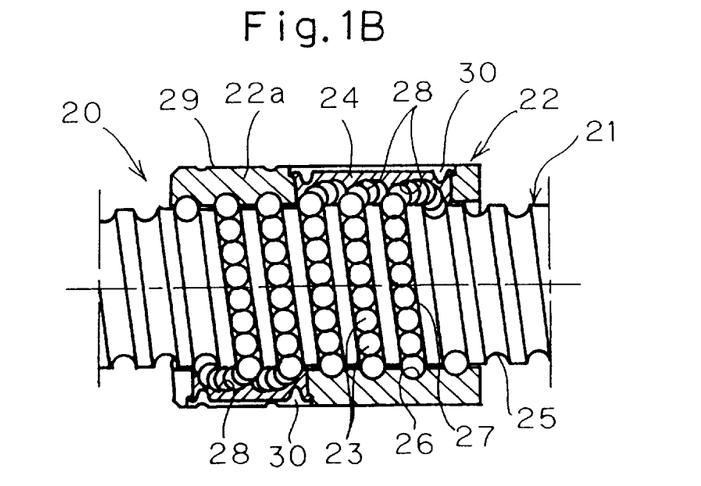
FIG. 1B is a longitudinal sectional view of the ball screw mechanism shown in FIG. 1A.
Figure 1C:
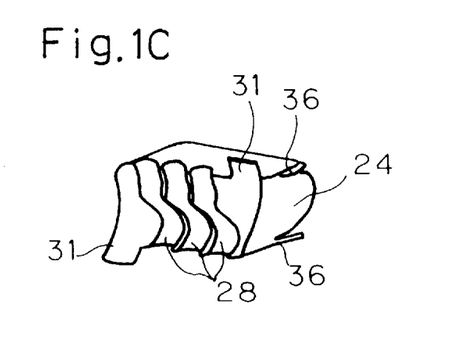
FIG. 1C is a perspective view of one of bridge members employed in the ball screw mechanism shown in FIG. 1A.

A first preferred embodiment of the present invention will now be described with particular reference to FIGS. 1 to 5. As shown in FIGS. 1A to 1C, a ball screw mechanism 20 shown therein includes a ball screw shaft 21, a rotary nut 22 mounted on the ball screw shaft 21 for movement axially of and relative to the ball screw shaft 21 and a series of balls 23 interposed between the ball screw shaft 21 and the rotary nut 22. The rotary nut 22 includes a substantially cylindrical nut body 22a having two bridge members 24 mounted thereon in a manner as will be described later. The ball screw shaft 21 has an externally threaded helical groove 25 defined on an outer peripheral surface thereof. The rotary nut 22 has an internally threaded helical groove 26 defined in an inner peripheral surface of the cylindrical nut body 22a in cooperable relation with the externally threaded helical groove 25 to define a ball rolling passage 27. The series of the balls 23 are rollingly accommodated within the ball rolling passage 27. As clearly shown, the rotary nut 22 has a portion of its outer peripheral surface knurled to define a surface roughened area 29 that is utilized for coupling with a rotor of an electric motor.

Each of the bridge member 24 has a concave surface which when mounted on the cylindrical nut body 22a faces towards the ball screw shaft 21 and is formed with a plurality of parallel connecting grooves 28 defined therein. Specifically, each of those connecting groove 28 of the bridge member 24 communicates the two neighboring convolutions of the internally threaded helical groove 26 together and, in the illustrated embodiments, the connecting grooves 28 communicates the successively neighboring convolutions of the internally threaded helical groove 26 together to thereby define single circumferentially extending passage. Accordingly, the internally threaded helical groove 26 of the rotary nut 22 is divided into a plurality of circumferentially extending passages over an axial length of the rotary nut 22 that is encompassed by the bridge member 24. Each of the parallel connecting grooves 28 in the bridge member 27 has a depth sufficient to allow each of the balls 23 to ride over a thread between the neighboring convolutions of the externally threaded helical groove 25 in the ball screw shaft 21 while being confined within the respective connecting passage 28.

The bridge members 24 are positioned on the nut body 22a at two respective locations spaced axially of the rotary nut 22 and are circumferentially spaced 180° about the longitudinal axis of the rotary nut 22. The number of the connecting grooves 28 in one of the bridge members 24 may differ from that in the other of the bridge members 24. In the illustrated embodiment particularly shown in FIG. 1, three connecting passages 28 are shown as formed in one of the bridge members 24 whereas two connecting passages 28 are shown as formed in the other of the bridge members 24. It is, however, to be noted that the number of the bridge members 24 employed in one rotary nut 22 may not be limited to two such as shown, but may be one or three or more.

Figure 2A:
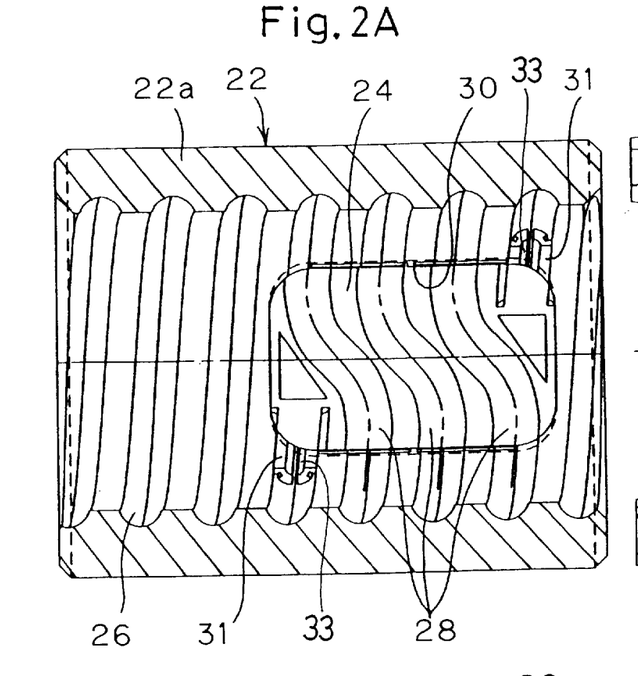
FIG. 2A is a longitudinal sectional view, on an enlarged scale, showing a rotary nut employed in the ball screw mechanism shown in FIG. 1A.
Figure 2B:
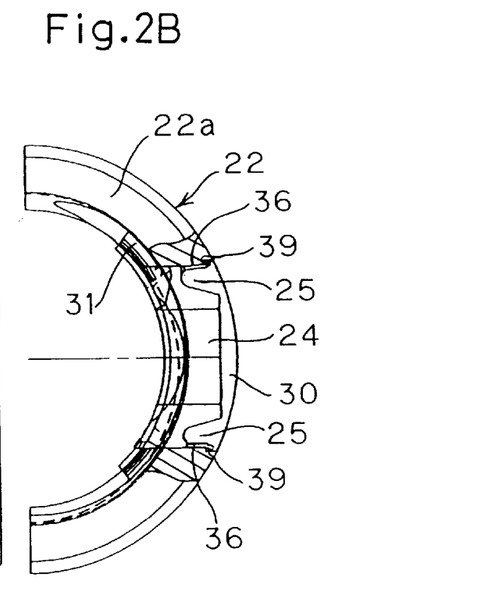
FIG. 2B is a fragmentary end view, with a portion cut out, showing one of radial halves of the rotary nut of FIG. 2A.
Figure 2C:
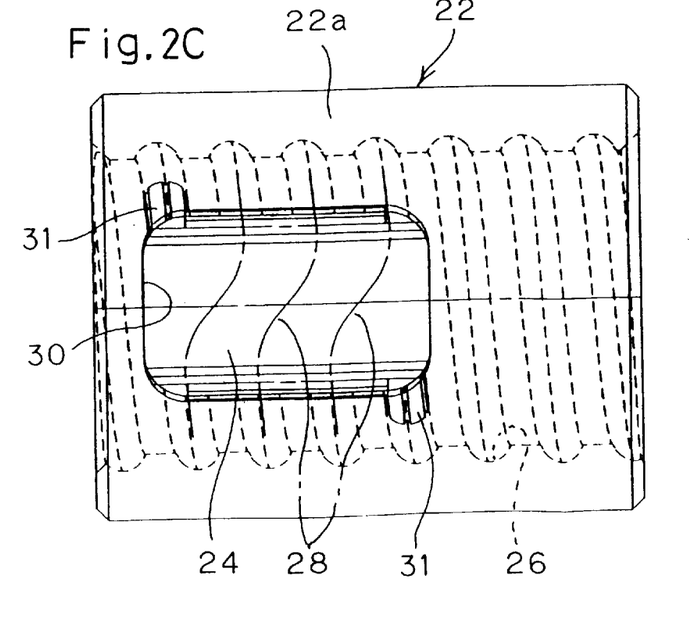
FIG. 2C is a rear view of the rotary nut of FIG. 2A as viewed in a direction opposite to that shown in FIG. 2A.
Figure 3A:
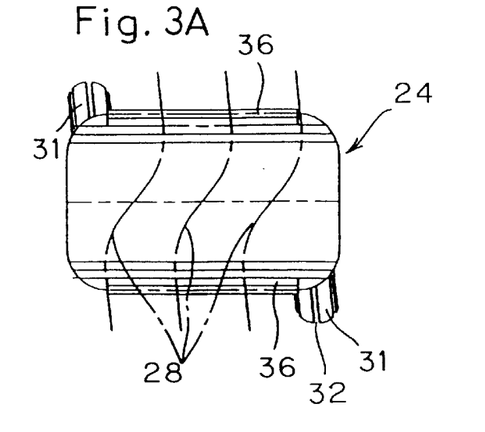
FIG. 3A is a front elevational view, on an enlarged scale, showing one of bridge members employed in the ball screw mechanism according to the first embodiment of the present invention.
Figure 3B:
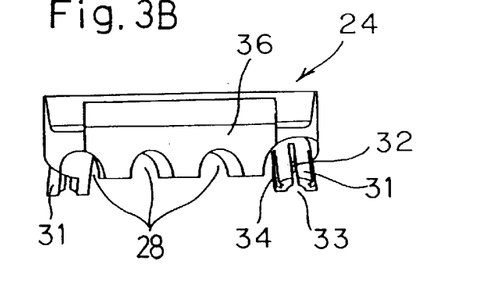
FIG. 3B is a plane view, with a portion cut out, of the bridge member shown in FIG. 3A.
Figure 3C:
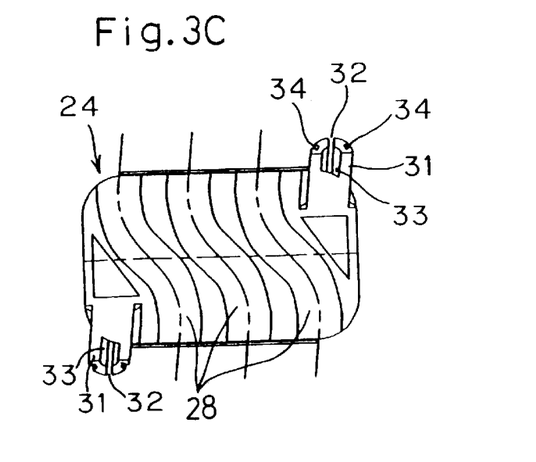
FIG. 3C is a rear elevational view of the bridge member as viewed in a direction opposite to FIG. 3A.
Figure 3D:
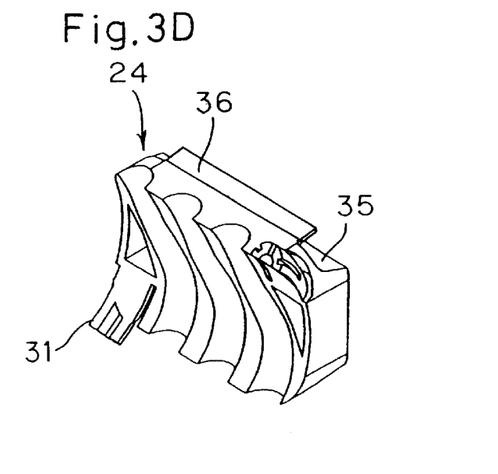
FIG. 3D is a perspective view of the bridge member shown in FIG. 3A.
Figure 3E:
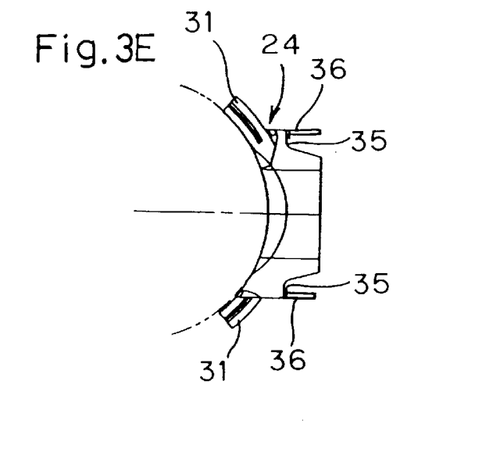
FIG. 3E is an end view of the bridge member shown as isolated from the rotary nut.

FIGS. 2A to 2C illustrates the details of the rotary nut 22 and FIG. 3 illustrates the details of one of the bridge members 24 with an outer appearance (an outer diametric shape) of the rotary nut 2 being schematically shown. The cylindrical nut body 22a of the rotary nut 22 has a bridge mounting hole 30 for each bridge member 24 defined therein so as to extend completely across the thickness of a cylindrical wall of the nut body 22a and the respective bridge member 24 is, after having been inserted into the hollow of the rotary nut 22 and then radially outwardly into the mounting hole 30, nested within the mounting hole 30.

Each of the bridge members 24 has a pair of arms 31 engaged in the internally threaded helical groove 26 of the rotary nut 22 for positioning the respective bridge member 24 axially relative to the nut body 22a of the rotary nut 22. These arms 31 are formed with respective opposite ends of each bridge member 24 so as to protrude therefrom in respective directions opposite to each other with respect to the circumference of the rotary nut 22. Respective portions of the internally threaded helical groove 26 of the rotary nut 22 in which the arms 31 are engaged define a ball non-circulating portion.

Each of the arms 31 has a generally semi-circular cross sectional shape in conformity with the curvature of the internally threaded helical groove 26 and is formed with a slit 32 extending from a free end thereof towards a base end thereof. It is to be noted that the externally and internally threaded helical grooves 25 and 26 have a cross sectional shape which specifically represents a Gothic arch. Each of the arms 31 has a rear surface, opposite to a front surface which is in contact with the internally threaded helical groove 26, formed with a generally semi-circular sectioned rear side groove 33 with the associated slit 32 tunneling from the front surface thereof to the rear side groove 33. Also, the front surface of each of the arms 31 is formed with a plurality of longitudinal grooves 34 of a depth not reaching the rear side groove 33.

Figure 4A:
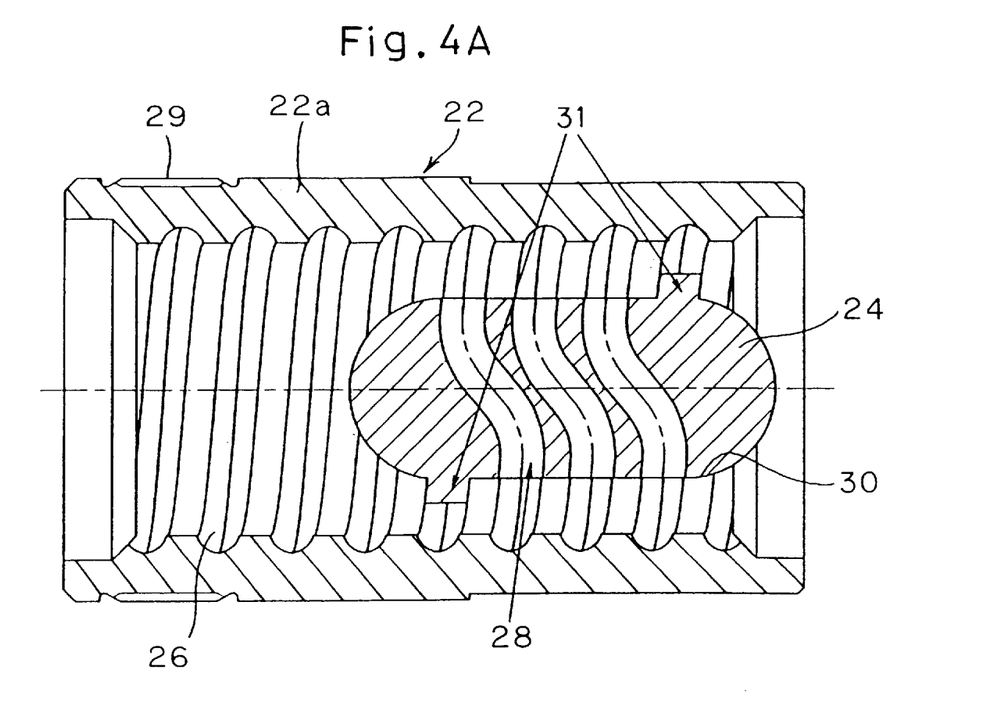
FIG. 4A is a longitudinal sectional view, with a portion cut out, of the rotary nut employed in the ball screw mechanism, showing a conceptual structure thereof.
Figure 4B:
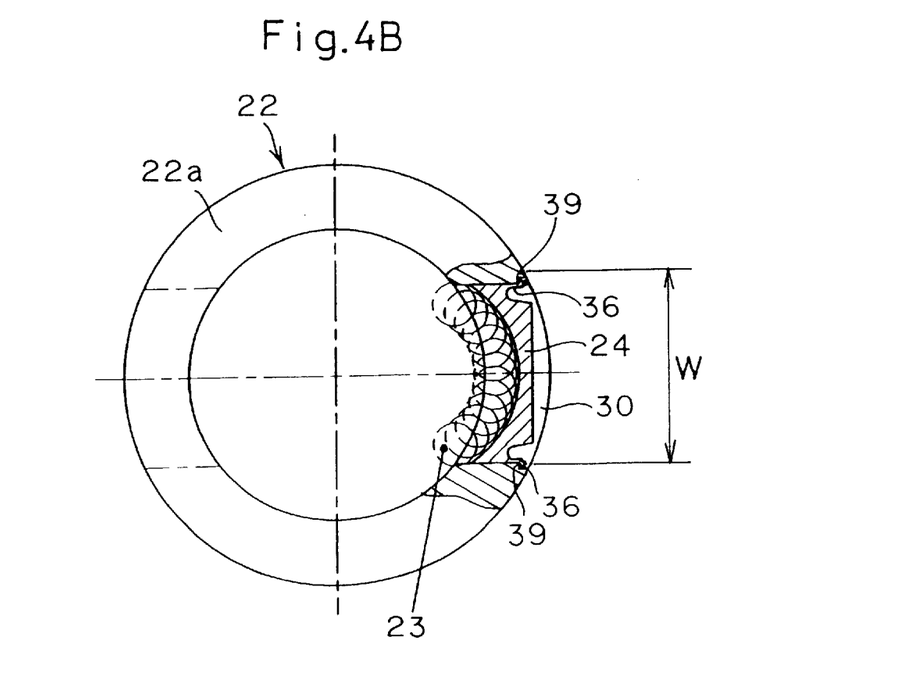
FIG. 4B is an end view, with a portion cut out, of the rotary nut shown in FIG. 4A.

A portion of an outer peripheral surface of each bridge member 24 adjacent a corresponding side edge thereof with respect the circumferential direction of the rotary nut 22 is inwardly depressed to define a respective setback area 35 (see FIG. 3E), that is set backwards from the outer peripheral surface of the bridge member 24, while leaving an adjacent guide wall 36 that bestrides from the corresponding side edge of the respective bridge member 24 in a direction radially outwardly of the rotary nut 22. As shown in FIG. 4B, the mounting hole 30 for each bridge member 24 has opposite outer side edges formed with respective engagement steps 39 so as to have an increased width W larger than the width of the corresponding mounting hole 30 as measured in a direction perpendicular to the longitudinal axis of the rotary nut 24.

Each of the bridge members 24 is fitted into the respective mounting hole 30 by first inserting it into the hollow of the nut body 22a and then urging it radially outwardly so as to be nested within the mounting hole 30 with the arms 31 engaged in the internally threaded helical groove 26. As the respective bridge member 24 is nested within the corresponding mounting hole 30, the guide walls 36 are plastically deformed so as to be fixed in position relative to the nut body 22a. This fixing by plastic deformation is carried out by crimping the guide walls 36 to respective inner side faces of the associated mounting hole 30 that are opposite to each other in a direction circumferentially of the rotary nut 22. More specifically, by causing the guide walls 36 integral with the respective bridge member 24 to be engaged with the respective engagement steps 39 by crimping respective free ends of the guide wall 36, the bridge member 24 is fixed in position relative to the rotary nut 22.

Figure 5A:
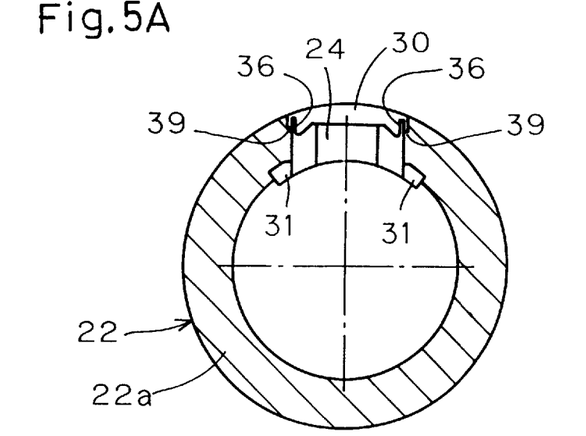
FIGS. 5A to 5C are end sectional views of the rotary nut, respectively, showing the sequence of mounting of the bridge member on the rotary nut.
Figure 5B:
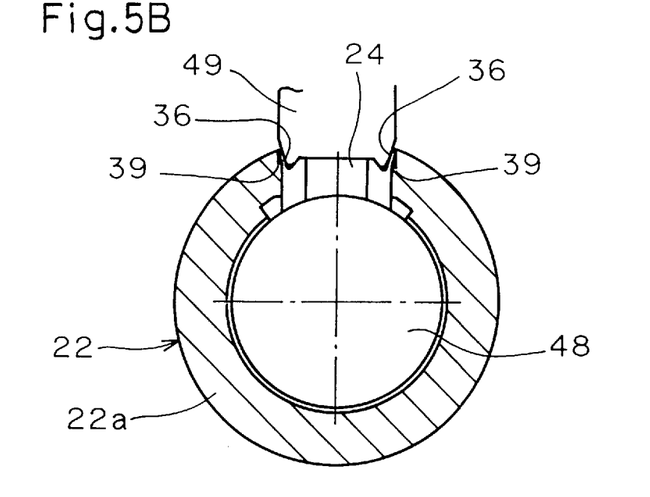
Figure 5C:
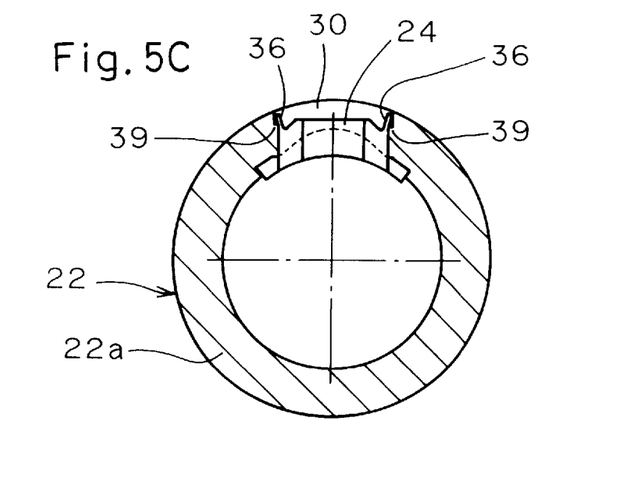

FIGS. 5A to 5C illustrate a manner in which the guide walls 36 are crimped. As shown in FIG. 5A, the bridge member 24 is fitted into the mounting hole 30 defined in the nut body 22a from inside of the hollow of the rotary nut 22 in the manner described previously. Starting from this condition, a core 48 for holding the bridge member 24 is inserted into the hollow of the nut body 22a as shown in FIG. 5B, followed by pressing of a punch 49 in a direction radially inwardly of the nut body 22a. The punch 49 has a working end formed integrally with a pair of outwardly tapering crimp edges and, accordingly, as the punch 49 is pressed towards the nut body 22a, the tapering crimp edges thereof causes the associated guide walls 36 to deform outwardly and be then crimped to allow the crimped guide walls 36 to firmly engage the engagement steps 39 in the mounting hole 30.

Each of the bridge member 24 may be made of a sintered alloy. Where the bridge members 24 are made of a sintered alloy, they can be manufactured by the use of an injection molding machine, using a metallic powder that is adjusted to a plastic state. During the injection molding of the bridge members 24, a mixture of the metallic powder, a plastic material and a binder is mixed by a kneading machine to provide a kneaded mixture which is subsequently palletized to provide metallic pellets. The metallic pellets so formed are then supplied to a hopper of the injection molding machine and are subsequently injected in a molten state into a mold assembly to complete each bridge member 24. The metallic powder is preferably of a kind capable of being carburized and may include, for example, 0.3% of carbon (C) and 1 to 2% of nickel (Ni), the balance being iron (Fe).

The nut body 22a of the rotary nut 22 may also be made of a sintered alloy which may be or may not be the same as that used for the bridge members 24.

In the ball screw mechanism 20 of the structure described above, since each of the bridge members 24 is formed with the guide walls 36 so that the guide walls 36 can be subsequently crimped to allow the respective bridge member 24 to be fixed in position within the respective mounting hole 30 in the rotary nut 22, firm fitting of the bridge member 24 can be easily and assuredly accomplished. The use of the crimping technique for this purpose eliminates the need to form separation preventive projections at respective tips of the guide walls 36, allowing the respective bridge member 24 to be simplified in shape. For this reason, where each bridge member 24 is to be formed of the sintered metal by the use of the injection molding technique, the molding thereof can easily be accomplished. Specifically, where each bridge member 24 is made of the sintered alloy, molding by the use of the injection molding technique and sintering are sufficient to manufacture it and no mechanical processing such as grinding or milling is necessary, resulting in a good productivity. Accordingly, inexpensive bridge members can be manufactured.

Since as hereinabove described each of the bridge members 24 is mounted inside the respective mounting hole 30 in the nut body 22a from inside of the hollow of the nut body 22a with the arms 31 consequently engaged in the internally threaded helical groove 26 and the guide walls 36 are subsequently engaged to the outer side edges of the corresponding mounting hole 30 by the use of a crimping technique, the bridge member 24 can be firmly interlocked in position with no possibility of being separated radially inwardly or outwardly of the corresponding mounting hole 30. Also, since each of the bridge members 24 is provided with the arms 31 that are engaged in the internally threaded helical groove 26 formed as a ball rolling surface in the rotary nut 22, a highly accurate positioning is possible. Yet, since the arms 31 are formed with the respective slits 32, the arms 31 can have a resiliency with which the arms 31 can conform to the internally threaded helical groove 26 with no gap formed therebetween.

The ball screw mechanism according to a second preferred embodiment of the present invention will now be described with reference to FIGS. 6 and 7. The ball screw mechanism 20 according to this embodiment is substantially similar to that according to the first embodiment shown in FIGS. 1 to 5, except that in place of the guide walls 36 formed integrally with each of the bridge members 24 in the previously described embodiment, a separate fixing member 41 is employed for each of the bridge members 24.

The fixing member 41 is of a structure including a pair of guide walls 41b upstanding radially outwardly of the rotary nut 22 adjacent the respective side edges of the respective bridge member 24 that are opposite to each other in the circumferential direction of the rotary nut 22. These guide walls 41b of the fixing member 41 are adapted to be resiliently engaged to opposite inner side faces of the corresponding mounting hole 30 formed in the nut body 22a, to thereby lock the bridge member 24 in the nut body 22a.

The fixing member 41 for each bridge member 14 is formed by the use of a press work, i.e., by pressing a steel plate to a specific shape and includes a generally groove-shaped principal body 41a having set-down pieces 41ab extending from respective opposite ends of a bottom piece portion 41aa (See FIG. 7B), and the guide wall 41b formed therewith and extending from a free end of the corresponding set-down piece 41ab so as to lie adjacent and parallel to such corresponding set-down piece 41ab. Each of the bridge members 24 has an outer diametric surface that is generally rectangular in shape, and the groove-shaped principal body 41a of the corresponding fixing member 41 rests on a rectangular portion 24a of the outer diametric surface of the bridge member 24. The outer diametric surface of each bridge member 24 that is flat is formed with an engagement groove 43 of a width sufficient to accommodate the fixing member 41, and the bottom piece portion 41aa of the groove-shaped principal body 41a of the associated fixing member 41 is received within such engagement groove 43.

The fixing member 41 is fixed in position in the respective bridge member 24 by means of a plurality of crimping portions 42 provided in the bridge member 24. The crimping portions 42 are made up of a plastic deformed portion that is plastically deformed to hold down opposite side walls of the bridge member 34 that define the engagement groove 43 in the bridge member 34 (See FIG. 7C).

Other structural features of the second embodiment than those described above are similar to those described in connection with the previously described embodiment.

With the structure according to the second embodiment, each bridge member 24 can be fixed in position within the associated mounting hole 30 in such a manner that the guide walls 41b of the fixing member 41, which is a separate member provided for the bridge member 24, are elastically held in contact with the inner side faces defining the mounting hole 30 in the rotary nut 22. Arrangement of the fixing member 41 as a member separate from the bridge member 24 is effective to further simplify the shape of the bridge member 24. For this reason, even when the bridge members 24 are molded by the use of an injection molding technique using the sintered metal, the molding can easily be accomplished. Since although the fixing member 41 is separate from the bridge member 24, it can be handled as an integral component part with the fixing member 41 fixed beforehand to the associated bridge member 24, there should be no problem in increase of the manufacturing steps during assemblage of the ball screw mechanism 20 and, hence, a good assemblability can be appreciated.

Figure 8A:
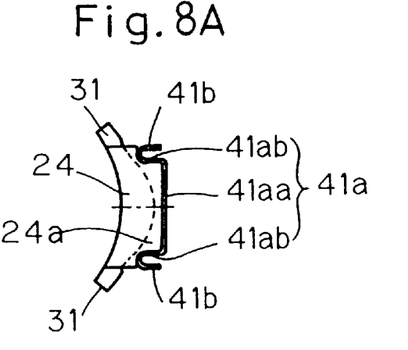
FIGS. 8A to 8C are end views of the bridge member showing different embodiments of the present invention, respectively.
Figure 8B:
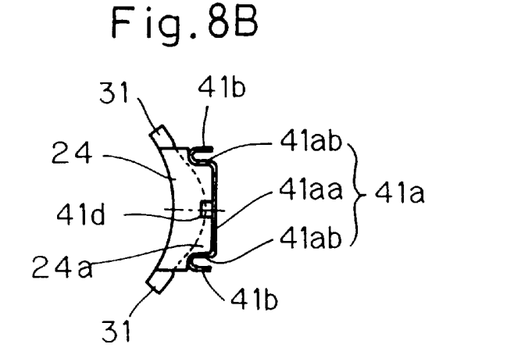

It is to be noted that in place of the crimping portions 42 employed in each of the bridge members 24, the fixing member 41 may be integrated with the respective bridge member 24 by the utilization of the resiliency possessed by the fixing member 41, an example of which is shown in each of FIGS. 8A and 8B.

In the example shown in FIG. 8A, the groove-shaped principal body 41a of the fixing member 41 is engaged in the rectangular portion 24a of the bridge member 24 and the resiliency of the groove shaped principal body 41a is utilized to fix the bridge member 24 in a sandwiched form. No engagement groove such as the engagement groove 43 employed in the embodiment of FIG. 7 is employed in the bridge member 24.

Figure 8C:
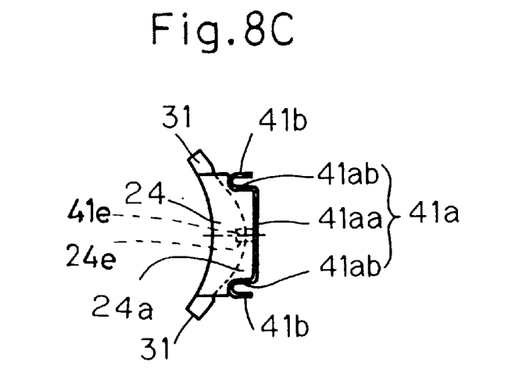

In the example shown in FIG. 8A, the fixing member 41 may be formed with a pin-shaped projection 41e as shown in FIG. 8C and, on the other hand, the bridge member 24 may be correspondingly formed with an aperture 24e for receiving the projection 41e to connect the fixing member 41 and the bridge member 24 together. Where the bridge member 24 is an injection molded product made of the sintered metal and the bridge member 24 in the form as engaged in the manner described previously is to be sintered, shrinkage of the bridge member 24 during the sintering can result in firm fastening of the projection 41e to thereby lock the bridge member 24 by radially pressing the projection 41e.

The example shown in FIG. 8B is substantially similar to the example shown in FIG. 8A, but differs therefrom in that axially opposite side edges of the principal body 41a of the fixing member 41 are formed with respective clamp pieces 41b in the form of a bent piece so that a portion of the bridge member 24 can be sandwiched between the clamp pieces 41b. With this structure shown in FIG. 8B, the fixing member 41 can be sandwiched in two directions perpendicular to each other by the set-down pieces 41ab of the principal body 41a and the clamp pieces 41d, resulting in a firm positioning of the fixing member 41 in position. Also, the clamp pieces 41d are effective to facilitate positioning of the fixing member 41 in an axial direction relative to the bridge member 24.

Figure 6:
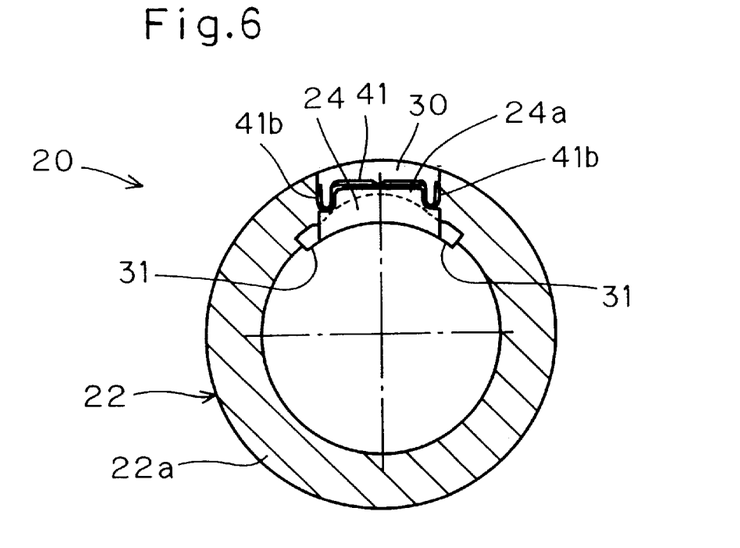
FIG. 6 is an end sectional view of the rotary nut employed in the ball screw mechanism according to a second preferred embodiment of the present invention.
Figure 7A:
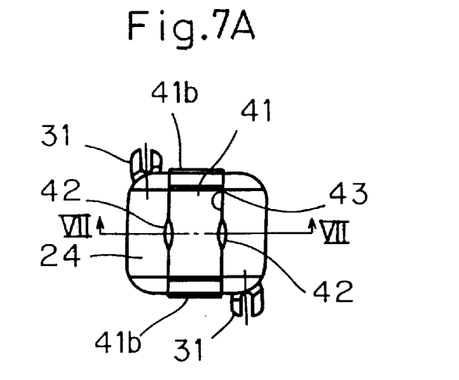
FIG. 7A is a front elevational view of the bridge member employed in the ball screw mechanism shown in FIG. 6.
Figure 7B:
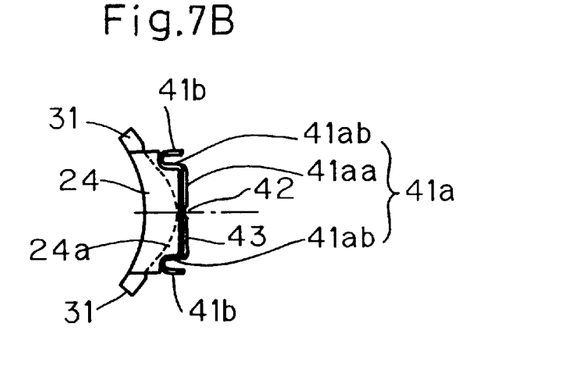
FIG. 7B is an end view of the bridge member employed in the ball screw mechanism shown in FIG. 6.
Figure 7C:
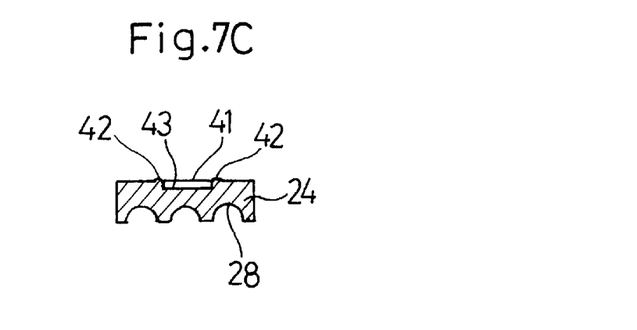
FIG. 7C is a cross-sectional view along line VII—VII of FIG. 7A.

Other structural features of any one of the examples shown in FIGS. 8A to 8C than those described above are substantially similar to those described and shown in connection with the second embodiment of FIGS. 6 and 7.

Figure 9:
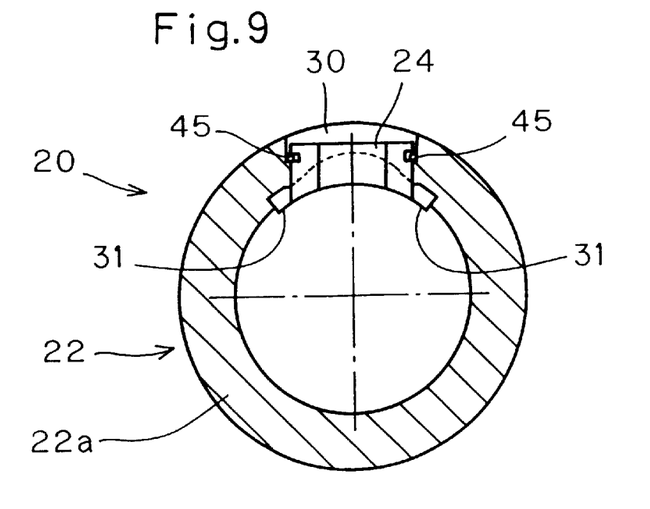
FIG. 9 is an end sectional view of the rotary nut employed in the ball screw mechanism according to a further embodiment of the present invention.
Figure 10:
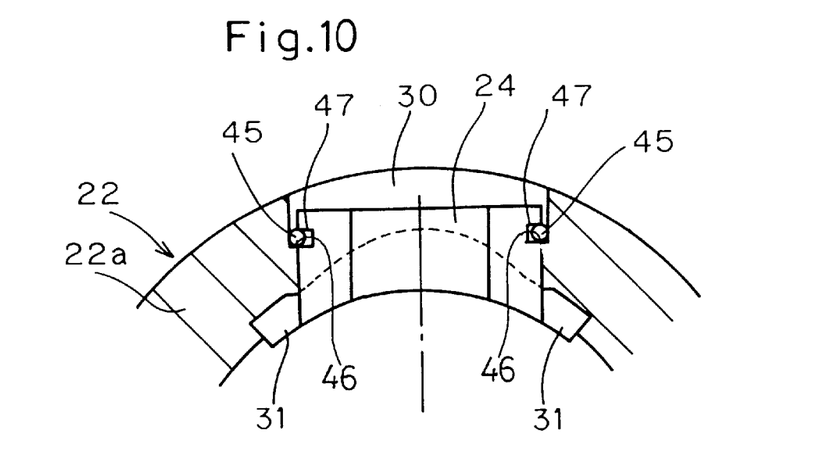
FIG. 10 is a fragmentary end sectional view, on an enlarged scale, showing a portion of the rotary nut in the ball screw mechanism shown in FIG. 9, showing how the bridge member is fixedly retained within a mounting hole in the rotary nut.
Figure 11:
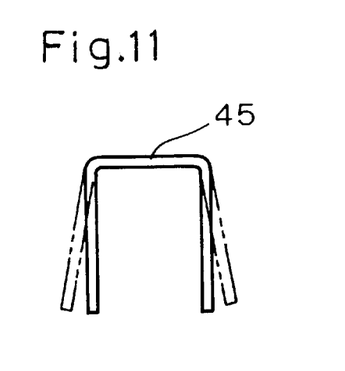
FIG. 11 is a schematic plane view of a fixing member employed to fix the bridge member in position within the mounting hole.

FIGS. 9 to 11 illustrate a third preferred embodiment of the present invention. The ball screw mechanism 20 according to this embodiment is substantially similar to that according to the first embodiment, but differs therefrom in that in place of the structure in which each of the bridge members 24 is integrally formed with the guide walls 36, a fixing member 45 in the form of a wire such as, for example, a steel wire is employed. In order for this particular fixing member 45 to be utilizable, the opposite inner side faces of each mounting hole 30 in the rotary nut 22 for accommodating the associated bridge member 24 are formed with engagement steps 46 and, on the other hand, the respective bridge member 24 is formed with engagement grooves 47 facing towards and cooperable with the engagement steps 46. The fixing member 45 in the form of the wire is engageable in the engagement steps 46 and the engagement grooves 47 to fixedly retain the bridge member 24 fixed relative to the rotary nut 22. Respective outer peripheral portions of the inner side faces of the mounting hole 30 that are positioned on a radially outward side with respect to the engagement grooves 47 are spaced from each other a distance greater than respective inner peripheral portions of the inner side faces of the mounting hole 30 that are positioned on a radially inward side with respect to the engagement grooves 47. The fixing member 45 in the form of the wire is of a generally U-shaped configuration as shown in FIG. 11 and delimited by a pair of arms and a bridge portion connecting the arms together. In a natural, unstressed condition, the fixing member 45 assumes such a shape as shown by the phantom line in FIG. 11 with the arms thereof diverging away from the bridge portion thereof.

At the time of assemblage, this fixing member 45 is inserted into the grooves 47 with the arms thereof deformed as shown by the solid line in FIG. 11 against its own resiliency. When the bridge member 24 is inserted into the respective mounting hole 30 from inside the hollow of the nut body 22a to assume a predetermined position within such mounting hole 30, the arms of the fixing member 45 then deformed against the resiliency of the fixing member 45 expand to assume the shape shown by the phantom line in FIG. 11 by the effect of the resiliency of the fixing member 45 and are therefore brought into engagement with the adjacent engagement steps 46 while contacting the inner side faces of the mounting hole 30. Upon engagement of the arms of the fixing member 45 with the engagement steps 46, the bridge member 24 is fixedly retained within the mounting hole 30 and is hence fixed relative to the nut body 22a. In this way, even though the use is made of the fixing member 45 prepared from a wire, each of the bridge member 24 can have a simplified shape and, where each bridge member 24 is formed by the use of an injection molding technique using the sintered metal, the molding can easily be accomplished.

Other structural features in this third embodiment than those described above are similar to those shown and described in connection with the first embodiment.

Figure 12:
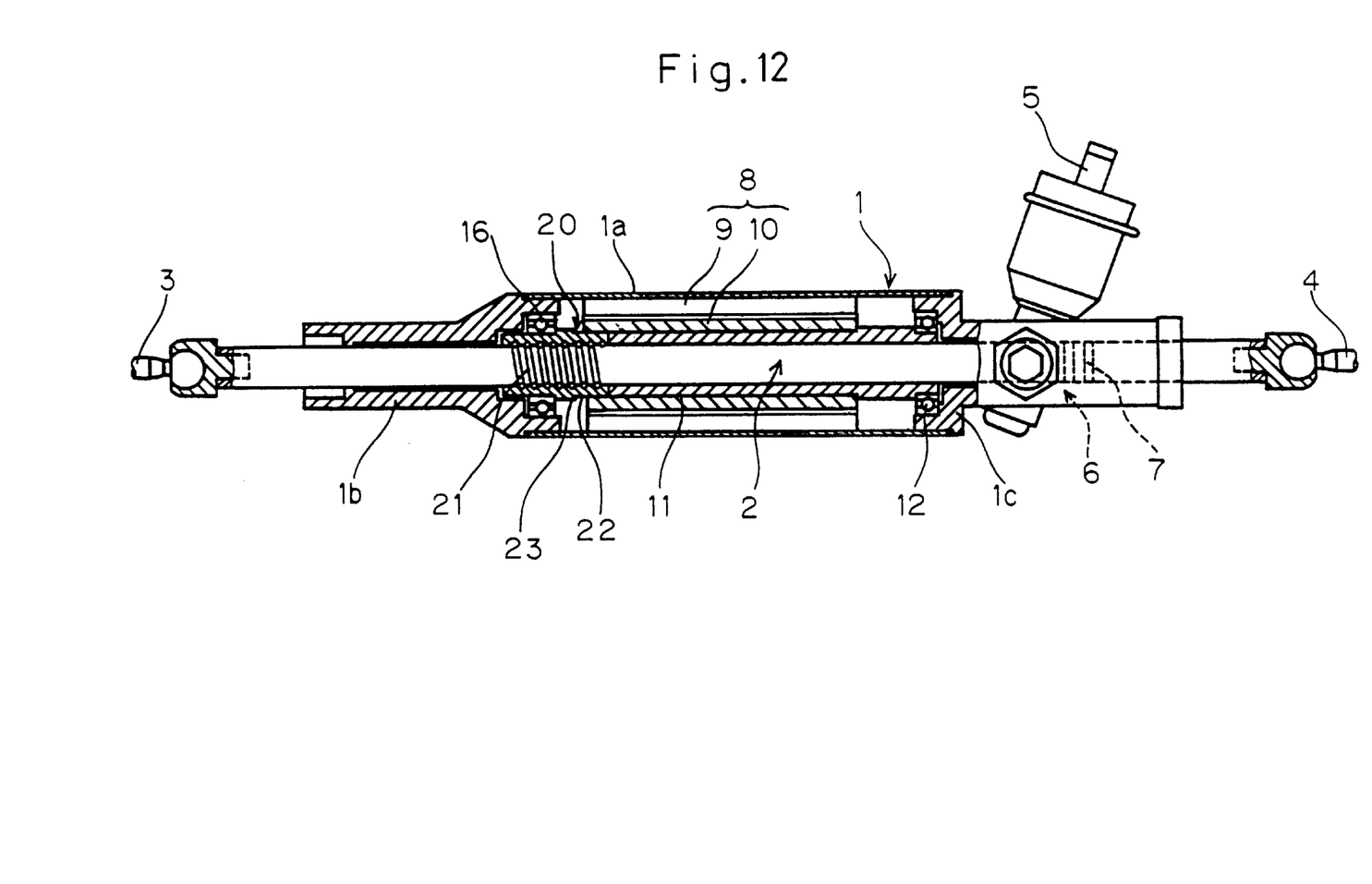
FIG. 12 is a longitudinal sectional view, with a portion cut out, showing an electrically powered steering device utilizing the ball screw mechanism according to the present invention.

An exemplary electrically powered steering device utilizing the ball screw mechanism 20 according to the present invention will now be described. FIG. 12 illustrates a longitudinal side view, with a portion cut out, of the exemplary electrically powered steering device. Referring to this figure, a housing 1 includes a bracket not shown and is fixed to a vehicle body structure at the bracket. A steering shaft 2 extends through the housing 1 and has its opposite ends connected with respective tie rods 3 and 4. The tie rods 3 and 4 are connected with a steering mechanism (not shown) for steering wheels.

A steering rod 5 is provided so as to extend diagonally upwardly from a portion of the housing 1 adjacent one end thereof and has an upper end on which a steering wheel is mounted. The steering rod 5 is rotatably supported and rotation of the steering rod 5 is transmitted as an axial shifting force to the steering shaft 2 from a lower end thereof through a motion translating mechanism 6. The motion translating mechanism 6 includes a rack gear 7 formed by a longitudinal portion of the steering shaft 2 and a pinion (not shown) mounted on a lower end of the steering rod 5, which pinion is meshed with the rack gear 7 within the housing 1. A steering torque detector (not shown) for detecting a steering torque is mounted in association with to the steering rod 5.

The housing 1 is formed in a cylindrical shape by connecting end members 1b and 1c to respective opposite ends of an intermediate barrel body 1a. A portion of the housing intermediate of the length thereof is provided with a stator 9 of an electric motor 8. The stator 9 includes a core and a stator coil. A rotor 10 of the electric motor 8 is housed within the stator 9 with a gap intervening therebetween. The rotor 10 is a magnetic body formed into a cylindrical shape and is fitted on an outer periphery of a sleeve 11 for rotation together with the sleeve 11. Within this sleeve 11, the steering shaft 2 is inserted for movement in a direction axially thereof. The electric motor 8 is controlled by a motor control circuit (not shown) in dependence on a detected value of the steering torque detector referred to above.

One end of the sleeve 11, for example, one end of the sleeve 11 adjacent the steering rod 5 so far shown, is rotatably supported within the housing 1 by means of a bearing 12. The bearing 12 may be a single independent bearing or a combination of a plurality of bearings and is of a type capable of supporting both a radial load and a thrust load.

Rotation of the electric motor 8 is transmitted as an axially shifting force to the steering shaft 2 through the ball screw mechanism 20. The ball screw mechanism 20 is of a structure in which an axial portion of the steering shaft 2 serves as the ball screw shaft 21. The rotary nut 22 of the ball screw mechanism 20 has an outer diametric portion rotatably supported by a bearing 16 within the housing 1 and also has an outer diametric surface engaged with one end of the rotor 10 of the electric motor 8. One end of the rotor 10 adjacent the rotary nut 22 protrudes beyond the sleeve 11, a protruding portion thereof being engaged with the rotary nut 22. Also, the rotary nut 22 has the surface roughened area 29 described hereinbefore and shown in FIG. 1A, and the rotor 10 is mounted on the rotary nut 22 with the surface roughened area 29 engaged with an inner peripheral surface of the rotor 22 in a slipless fashion.

The bearing 16 may be a single independent bearing or a combination of a plurality of bearings and is as a whole of a type capable of supporting both a radial load and a thrust load. This bearing 16 may be employed. In the form of, for example, a rolling bearing such as an angular ball bearing or the like, having an inner race, an outer race and a series of rolling elements interposed between the inner and outer races.

The operation and function of the above described construction will be described. Assuming that the vehicle is driven straight and the steering wheel is held standstill, no torque signal is outputted from the steering torque detector (not shown) for the steering rod 5 and the electric motor 8 is held in a halted condition by the motor control means (not shown). Accordingly, the electrically powered steering device is in condition not to provide a steering assist force.

When the steering wheel is steered, a torque signal is outputted from the steering torque detector of the steering rod 5 and, under the control of the motor control circuit, the electric motor 8 drives the rotor 10. Upon rotation of the rotor 10, the rotary nut 22 of the ball screw mechanism 20 undergoes rotation together with the rotor 10 and the steering shaft 2 having a portion thereof formed as the ball screw shaft 2a is consequently axially moved to thereby generate the steering assist force.

At this time, the balls of the ball screw mechanism 20 rollingly move within the rolling passage defined between the internally and externally threaded helical grooves 25 and 26.

In this way, the steering force of the steering wheel is assisted by the electric motor 8.

Since the ball screw mechanism 20 employed in the electric power steering device as a principal component parts for transmitting the motor output is so designed and so configured as hereinbefore fully described, the ball screw mechanism 20 can be assembled compact in size and have a high load capacity and, therefore, the electrically powered steering device utilizing such ball screw mechanism 20 can also be assembled compact in size.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A ball screw mechanism which comprises:
   a ball screw shaft;
   a rotary nut having an internally threaded helical groove defined on an inner peripheral surface thereof in face-to-face relation with the ball screw mechanism;
   a plurality of balls rollingly accommodated in series within a ball rolling passage defined between the ball screw shaft and the internally threaded helical groove for transmitting a force from one of the rotary nut and the ball screw shaft to the other thereof; and
   at least one bridge member having at least one groove defined therein and mounted in the rotary nut with the groove communicating neighboring convolutions of the internally threaded helical groove, said bridge member being fixedly connected with the rotary nut by means of a plastic deformation.

2. The ball screw mechanism as claimed in claim 1, wherein the bridge member includes an arm engageable with the internally threaded helical groove of the rotary nut for positioning the bridge member axially relative to the rotary nut.

3. The ball screw mechanism as claimed in claim 2, wherein the rotary nut has at least one mounting hole defined therein for accommodating the bridge member; wherein the bridge member has opposite side edges in a direction circumferentially of the rotary nut, said opposite side edges of the bridge member being formed with respective guide walls upstanding therefrom in a direction radially of the rotary nut; and wherein said guide walls being crimped to engage respective inner side faces of the mounting hole defined in the rotary nut.

4. The ball screw mechanism as claimed in claim 2, wherein the bridge member is made of sintered alloy.

5. The ball screw mechanism as claimed in claim 2, wherein the bridge member has plurality of connecting grooves each for communicating neighboring convolutions of the internally threaded helical grooves.

6. The ball screw mechanism as claimed in claim 1, wherein the rotary nut has at least one mounting hole defined therein for accommodating the bridge member; wherein the bridge member has opposite side edges in a direction circumferentially of the rotary nut, said opposite side edges of the bridge member being formed with respective guide walls upstanding therefrom in a direction radially of the rotary nut; and wherein said guide walls being crimped to engage respective inner side faces of the mounting hole defined in the rotary nut.

7. The screw mechanism as claimed claim 6, wherein the bridge member is made of a sintered alloy.

8. The ball screw mechanism as claimed in claim 6, wherein the bridge member has a plurality of connecting grooves each for communicating neighboring convolutions of the internally threaded helical grooves.

9. The ball screw mechanism as claimed in claim 1, wherein the bridge member is made of a sintered alloy.

10. The ball screw mechanism as claimed in claim 1, wherein the bridge member has a plurality of connecting grooves each for communicating neighboring convolutions of the internally threaded helical grooves.

11. A ball screw mechanism which comprises:
a ball screw shaft;
a rotary nut having an internally threaded helical groove defined on an inner peripheral surface thereof in face-to-face relation with the ball screw mechanism, said rotary nut having at least one mounting hole defined therein;
at least one bridge member accommodated within the mounting hole and having at least on groove defined therein and mounted in the rotary nut with the groove communicating neighboring convolutions of the internally threaded helical groove; and
a separate fixing member mounted on the bridge member and including guide walls upstanding therefrom in a direction radially of the rotary nut along opposite side edges of the rotary nut with respect to a circumferential direction thereof, said guide walls being resiliently engaged with opposite inner side faces of the mounting hole defined in the rotary nut to thereby allow the bridge member to be fixedly retained within the mounting hole.

12. The ball screw mechanism as claimed in claim 11, wherein the fixing member is prepared from a steel plate by means of a press work and is mounted on the bridge member by means of crimping the bridge member.

13. The ball screw mechanism as claimed in claim 12, wherein the bridge member is made of a sintered alloy.

14. The ball screw mechanism as claimed in claim 12, wherein the bridge member has a plurality of connecting grooves each for communicating neighboring convolutions of the internally treaded helical grooves.

15. The ball screw mechanism as claimed in claim 11, wherein the fixing member is prepared from a steel plate by means of a press work and is mounted on the bridge member by utilization of a resiliency of the fixing member.

16. The ball screw mechanism as claimed in claim 15, wherein the bridge member is made of a sintered alloy.

17. The ball screw mechanism as claimed in claim 15, wherein the bridge member has a plurality of connecting grooves each for communicating neighboring convolutions of the internally threaded helical grooves.

18. The ball screw mechanism as claimed in claim 11, wherein the bridge member is made of a sintered alloy.

19. The ball screw mechanism is claimed in claim 11, wherein the bridge member has a plurality of connecting grooves each for communicating neighboring convolutions of the internally threaded helical grooves.

20. A ball screw mechanism which comprises:
a ball screw shaft;
a rotary nut having an internally threaded helical groove defined on an inner peripheral surface thereof in face-to-face relation with the ball screw mechanism, said rotary nut having at least one mounting hole defined therein, said mounting hole having opposite side faces formed with respective engagement steps defined therein;
a plurality of balls rollingly accommodated in series within a ball rolling passage defined between the ball screw shaft and the internally threaded helical groove for transmitting a force from one of the rotary nut and the ball screw shaft to the other thereof;
at least one bridge member accommodated within the mounting hole and having at least one groove defined therein and mounted in the rotary nut with the groove communicating neighboring convolutions of the internally threaded helical groove, said bridge member being formed with engagement grooves aligned and cooperable with the respective engagement steps; and
a fixing member made up of a wire and engaged in part with the engagement steps and in part within the engagement grooves to thereby allow the bridge member to be fixedly retained within the mounting hole.

21. The ball screw mechanism as claimed in claim 20, wherein the bridge member is made of a sintered alloy.

22. The ball screw mechanism as claimed in claim 20, wherein the bridge member has a plurality of connecting grooves each for communicating neighboring convolutions of the internally threaded helical grooves.

23. An electrically powered steering device which comprises:
a housing;
a steering shaft accommodated in the housing and drivingly coupled with a steering mechanism for steering wheels;
a motion translating mechanism for converting a rotational force of a steering wheel into a force required to displace the steering shaft in a direction axially thereof,
a ball screw mechanism including a ball screw shaft defined by a portion of the steering shaft and a rotary nut operatively mounted on the ball screw shaft, said ball screw mechanism being of a structure as defined in any one of claims 1 to 10, and
an electric motor for driving the rotary nut.

* * * * *